US009442633B2

(12) United States Patent
Dyer et al.

(10) Patent No.: US 9,442,633 B2
(45) Date of Patent: Sep. 13, 2016

(54) SPORTS SWING MECHANICS TRAINING DEVICE

(71) Applicant: Latent Performance, LLC, Topsfield, MA (US)

(72) Inventors: Ellery Dyer, Topsfield, MA (US); Steve Carll, Raymond, ME (US); William Morong, Paoli, PA (US); Michael Trachtman, Brookline, MA (US)

(73) Assignee: LATENT PERFORMANCE LLC, Topsfield, MA (US)

( * ) Notice: Subject to any disclaimer, the term of this patent is extended or adjusted under 35 U.S.C. 154(b) by 193 days.

(21) Appl. No.: 14/473,408

(22) Filed: Aug. 29, 2014

(65) Prior Publication Data

US 2015/0087446 A1    Mar. 26, 2015

Related U.S. Application Data

(60) Provisional application No. 61/882,037, filed on Sep. 25, 2013.

(51) Int. Cl.
*G06F 3/0482* (2013.01)
*G06K 9/00* (2006.01)
*G09B 19/00* (2006.01)

(52) U.S. Cl.
CPC ......... *G06F 3/0482* (2013.01); *G06K 9/00342* (2013.01); *G09B 19/0038* (2013.01)

(58) Field of Classification Search
CPC .............................. A63B 69/38; A63B 24/00
USPC ...................................................... 473/222
See application file for complete search history.

(56) References Cited

U.S. PATENT DOCUMENTS

| 4,605,226 A | | 8/1986 | Morrissey |
| 5,056,783 A | | 10/1991 | Matcovich et al. |
| 5,694,340 A | | 12/1997 | Kim |
| 5,723,786 A | | 3/1998 | Klapman |
| 5,800,278 A | * | 9/1998 | Varriano ............ A63B 69/3608 473/209 |
| 5,907,819 A | | 5/1999 | Johnson |
| 6,042,492 A | * | 3/2000 | Baum ................ A63B 24/0003 434/257 |

(Continued)

OTHER PUBLICATIONS amazon.com; "Louisville Slugger Swing Batting Trainer"; http://www.amazon.com/Louisvile-Slugger-L30325-Instructo-Batting/dp/B00B8SGTDU; Oct. 24, 2013.

(Continued)

*Primary Examiner* — David L Lewis
*Assistant Examiner* — Shauna-Kay Hall
(74) *Attorney, Agent, or Firm* — North Shore Patents, P.C.; Michele Liu Baillie

(57) ABSTRACT

A base unit of a sports swing mechanics training device receives from a swing detector a swing detection message indicating a swing motion by a player, and in response, displays a visual symbol for a predetermined period of time. When the device receives a user selection of a visual symbol from the player, it is compared with the displayed visual symbol. If they match, the device indicates a symbol match. Otherwise, the device indicates a symbol mismatch. The base unit is placed at a location where the displayed visual symbol would be visible to the player immediately following contact with a ball when the player's eyes are in a desired position during the swing motion. The device trains players to keep their heads and eyes correctly directed at the point of collision with the ball during and immediately following the ball collision.

13 Claims, 9 Drawing Sheets

(56) References Cited

U.S. PATENT DOCUMENTS

| | | | |
|---|---|---|---|
| 6,146,289 A | | 11/2000 | Miller et al. |
| 6,254,492 B1 | * | 7/2001 | Taggett .............. A63B 24/0003 434/252 |
| 6,378,367 B1 | | 4/2002 | Dilz, Jr. |
| 6,533,675 B2 | | 3/2003 | Funk |
| 6,565,448 B2 | * | 5/2003 | Cameron .......... A63B 24/0003 473/131 |
| 7,169,067 B2 | | 1/2007 | Town |
| 7,214,146 B1 | | 5/2007 | Gersang |
| 7,264,554 B2 | | 9/2007 | Bentley |
| 7,513,833 B1 | * | 4/2009 | Town ................. A63B 69/3623 473/219 |
| 7,686,740 B1 | | 3/2010 | Chang |
| 7,771,263 B2 | | 8/2010 | Telford |
| 8,337,335 B2 | | 12/2012 | Dugan |
| 8,342,978 B2 | | 1/2013 | Tamura |
| 8,430,770 B2 | | 4/2013 | Dugan |
| 8,465,377 B1 | | 6/2013 | Kamnikar et al. |
| 2002/0077189 A1 | * | 6/2002 | Tuer ................... A63B 69/3632 473/151 |
| 2002/0183657 A1 | | 12/2002 | Socci et al. |
| 2004/0014531 A1 | * | 1/2004 | Ziener-Gundersen . A63B 15/00 473/222 |
| 2005/0054457 A1 | | 3/2005 | Eyestone et al. |
| 2006/0199671 A1 | * | 9/2006 | Town ................. A63B 69/0002 473/417 |
| 2007/0021269 A1 | * | 1/2007 | Shum ..................... A61B 5/11 482/8 |
| 2007/0135225 A1 | * | 6/2007 | Nieminen .......... A63B 24/0006 473/212 |
| 2008/0085778 A1 | * | 4/2008 | Dugan ............... A63B 69/3623 473/223 |
| 2009/0231960 A1 | * | 9/2009 | Hutcheson ............. G04G 17/04 368/10 |
| 2009/0305824 A1 | | 12/2009 | Sanders |
| 2011/0208444 A1 | | 8/2011 | Solinsky |
| 2013/0095962 A1 | | 4/2013 | Yamamoto et al. |

OTHER PUBLICATIONS golfsmith.com, "Analyze Your Golf Swing in Real-Time", http://www.golfsmith.com/display?page=ps/golf-swing-analyzers; Oct. 23, 2013.

* cited by examiner

SPORTS SWING MECHANICS TRAINING DEVICE

CROSS-REFERENCE TO RELATED APPLICATIONS

The present application claims priority to U.S. provisional patent application Ser. No. 61/882,037, filed on Sep. 25, 2013.

BACKGROUND OF THE INVENTION

Some sports games, such as baseball, golf, tennis, and other games, involve swinging a bat, club, or racket to strike a ball in order to propel the ball in a desired direction with a desired speed. In baseball, the ball is "pitched" (thrown) toward the batter by a pitcher. During the flight of the ball, the batter prepares to swing the bat to contact the ball and propel it in another direction. In golf, the ball rests on a small pedestal called a "tee" placed slightly in front of the golfer's toes or on the ground. In tennis, the ball is hit toward the player by an opponent using a tennis racket. In each game, striking the ball with optimum swing dynamics requires the player to keep their eyes directed at the ball from the beginning of the swing until the bat, club, or racket contacts the ball, and following the collision, in the direction of the collision, even after the ball takes flight. However, many players fail to keep their eyes on the ball up to the point of collision and in the direction of the collision after collision, and thus they fail to see the collision of the bat, club, or racket with the ball and complete the swing with proper mechanics. Consequently, the ball is missed or is hit poorly. Some devices exist as aids to improve a player's swing. These devices focus on the proper head position during the swing motion. However, determining head position does not directly correlate to the eye position during and/or immediately following the ball collision. Further, some of these devices require replacement of standard equipment with specialized equipment or are cumbersome, which can negatively impact user performance. Some of these devices may require that the ball be stationary and placed onto a specialized device, which limits their use in swing practice.

BRIEF SUMMARY OF THE INVENTION

According to one embodiment of the present invention, in a method for providing sports swing mechanics training, a training device receives a swing detection message. The swing detection message indicates a detection of a swing motion by a player. The training device displays a visual symbol for a predetermined period of time. When the training device receives a user selection of a visual symbol from the player, the training device compares the user selection with the displayed visual symbol. In response to determining that the user selection matches the displayed visual symbol, the training device indicates a symbol match. In response to determining that the user selection does not match the displayed visual symbol, the training device indicates a symbol mismatch.

In one aspect of the present invention, a base unit of the training device receives the swing detection message from a remote unit of the training device. The base unit is placed at a location wherein the displayed visual symbol would be visible to the player immediately following contact with the ball when the player's eyes are in a desired position during the swing motion.

In one aspect of the present invention, in response to determining that the user selection matches the displayed visual symbol, the base unit activates a correct selection indicator. In response to determining that the user selection does not match the displayed visual symbol, the base unit activates an incorrect selection indicator.

In one aspect of the present invention, a remote unit of the training device and the base unit includes one of the following: a smartphone; a personal computer; a laptop computer; a tablet; and a smart watch.

In one aspect of the present invention, a training session is initialized by the training device. The base unit of the training device begins a video recording of the training session. in response to receiving the swing detection message, the base unit sets a begin time marker and an end time marker in the video recording. When the training device determines an end to the training session, the base unit creates a plurality of video clips, where each video clip includes a video from the begin time marker to the end time marker associated with the swing motion.

In one aspect of the present invention, the base unit combines the plurality of video clips into a single video.

In one aspect of the present invention, a session swing count is incremented, where the session swing count is a number of swing motions detected during the training session. In response to determining that the user selection matches the displayed visual symbol, a match count is incremented, where the match count is a number of correct user selections.

According to another embodiment of the present invention, a system includes a swing detector and a base unit. The swing detector includes an accelerometer for detecting a swing motion by a player and a microcontroller for sending to a base unit a swing detection message indicating the detection of the swing motion. The base unit includes a display, a visual symbol generator for, in response to receiving the swing detection message, generating a visual symbol and displaying the visual symbol on the display for a predetermined period of time, a memory for storing the displayed visual symbol, an input device for receiving a user selection of a visual symbol from the player, a comparator for comparing the user selection with the stored visual symbol, a correct selection indicator, where in response to determining that the user selection matches the stored visual symbol, the correct selection indicator is activated, and an incorrect selection indicator, where in response to determining that the user selection does not match the stored visual symbol, the incorrect selection indicator is activated.

In one aspect of the present invention, the system includes a plurality of base units coupled to the swing detector, where the plurality of base units is placed at a plurality of locations corresponding to a plurality of desired positions for the player's eyes.

Computer readable medium corresponding to the above-summarized methods are also described and claimed herein.

DETAILED DESCRIPTION OF THE INVENTION

Figure 1:
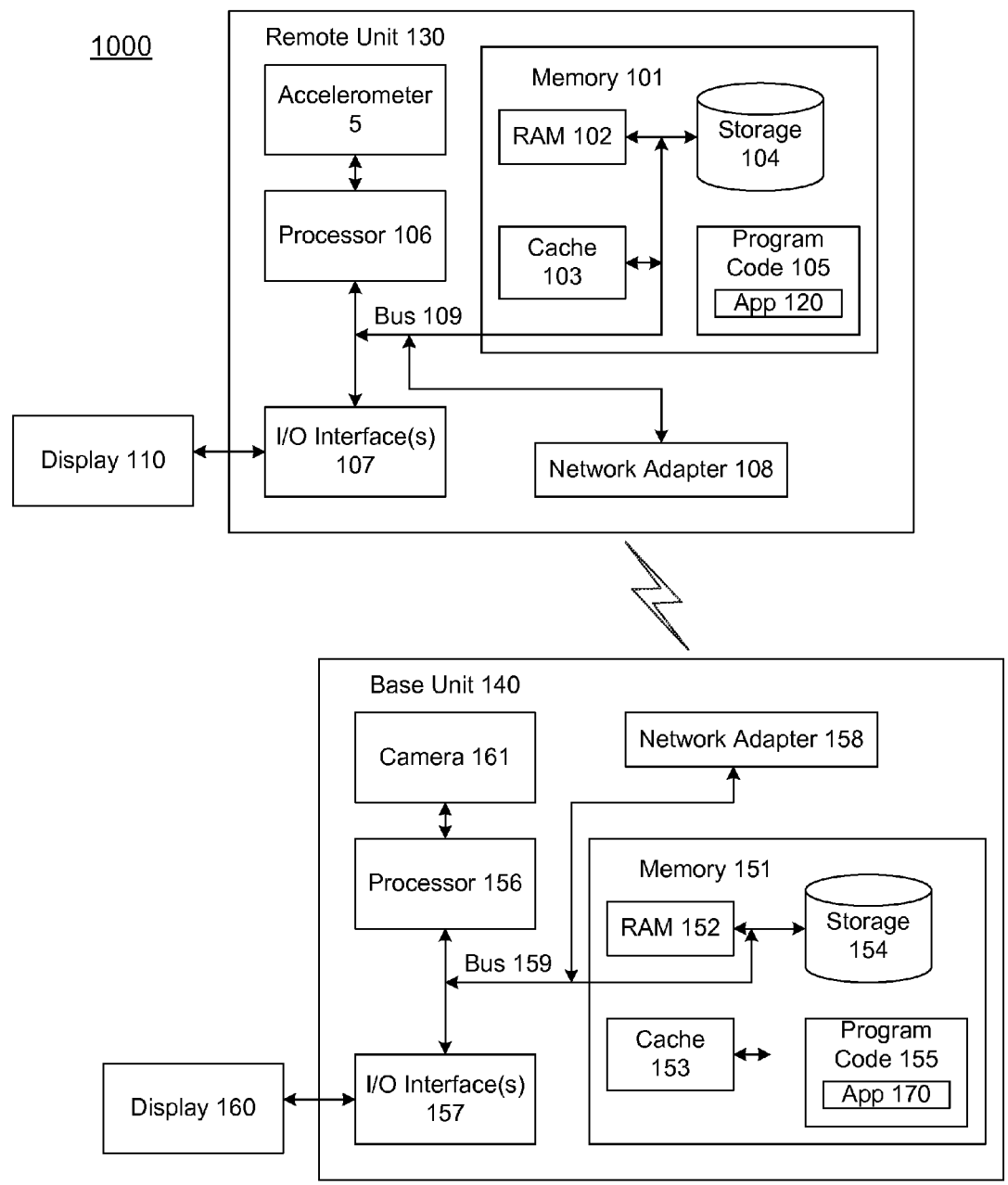
FIG. 1 illustrates a sports swing mechanics trainer according to a first embodiment of the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or compute readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a sports swing mechanics training device according to a first embodiment of the present invention. The training device 1000 comprises two computing devices, a remote unit 130 and a base unit 140. The remote unit 130 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105. The program code module 105 comprises an application 120 that are configured to carry out the functions of embodiments of the present invention at the remote unit 130 when executed by the processor 106. The remote unit 130 communicates with one or more input/output (I/O) devices via I/O interfaces 107, including a display 110 and input devices, such as a touchscreen, buttons, and a keyboard. The remote unit 130 may communicate with one or more devices or networks via network adapter 108. The remote unit 130 may be a computing system of any type, such as a smartphone or smart watch.

The base unit 140 is operationally coupled to a processor or processing units 156, a memory 151, and a bus 159 that couples various system components, including the memory 151 to the processor 156. The bus 159 represents one or more of any of several types of bus structure, including a memory bus or memory controller, a peripheral bus, an accelerated graphics port, and a processor or local bus using any of a variety of bus architectures. The memory 151 may include computer readable media in the form of volatile memory, such as random access memory (RAM) 152 or cache memory 153, or non-volatile storage media 154. The memory 151 may include at least one program product having a set of at least one program code module 155. The program code module 155 comprises an application 170 that are configured to carry out the functions of embodiments of the present invention at the base unit 140 when executed by the processor 156. The base unit 140 communicates with one or more I/O devices via I/O interfaces 157, including a display 160 and input devices, such as such as a touchscreen, buttons, and a keyboard. The base unit 140 may communicate with one or more devices or networks via network adapter 158. The base unit 140 may communicate with the remote unit 130 via their respective network adapters 106 and 158 over a wireless connection, such as WiFi, Bluetooth, RF, cellular, etc. Alternatively, the base unit 140 and remote unit 130 may communicate over a wired connection, such as USB, Ethernet, coaxial, fiber optic, wire line, etc. The base unit 140 may be a computing system of any type, such as a tablet or PC.

The remote unit 130 further comprises an accelerometer 5 for detecting a swing motion by g-force. Other manners of detecting a swing motion include, but are not limited to radar, optical detection, image analysis, and ultrasonic detection. Upon detecting a swing motion, the remote unit application 120 sends a signal or message to the base unit application 170 to indicate the occurrence of a swing motion. The remote unit application 120 thus functions as a swing detector. The remote unit 130 may be located on a player's bat, glove, club, or racket. The remote unit 130 may alternatively be located on a wrist of the player's arm that's swinging the bat, glove, club, or racket. The base unit 140 further comprises a camera 161 for recording video with or without audio.

Optionally, a protective device may be coupled to the base unit 140 to protect the base unit 140 should it be hit by the ball. For example, a cage comprising metal or plastic wire mesh may be coupled to the base unit 140 to protect it while still allowing the user to see the visual symbols displayed on the display 160 and without obstructing the camera 161. The cage may also comprise features to allow the base unit 140 to be angled such that the display 160 is more easily seen by the user.

Although the remote unit 130 and the base unit 140 are described with the functions as illustrated in FIG. 1, one or more functions of the remote unit 130 and the base unit 140 may be integrated into the same unit, in different variations, without departing from the spirit and scope of the present invention.

Figure 2A:
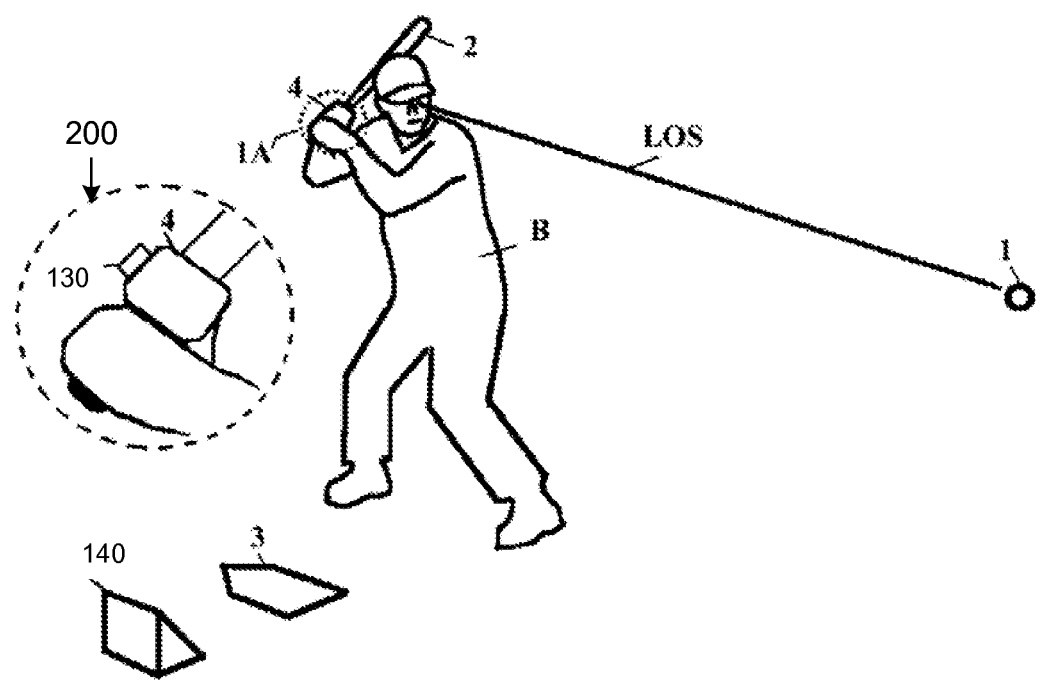
FIGS. 2A-2C illustrate an example of the trainer in use throughout a swing motion.
Figure 2B:
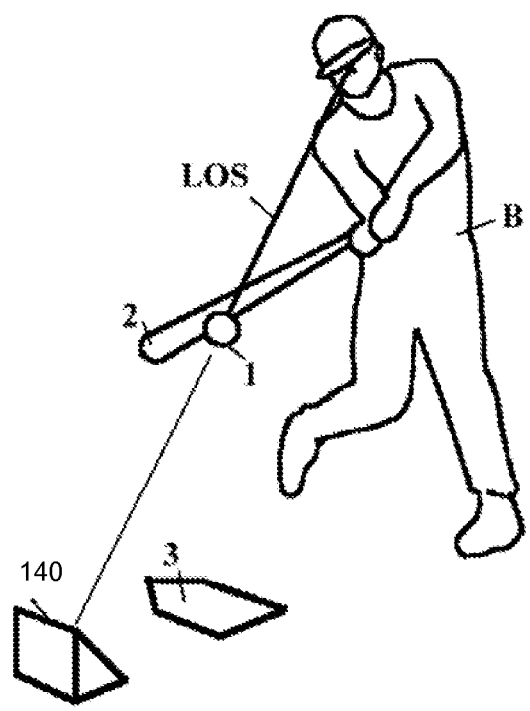
Figure 2C:
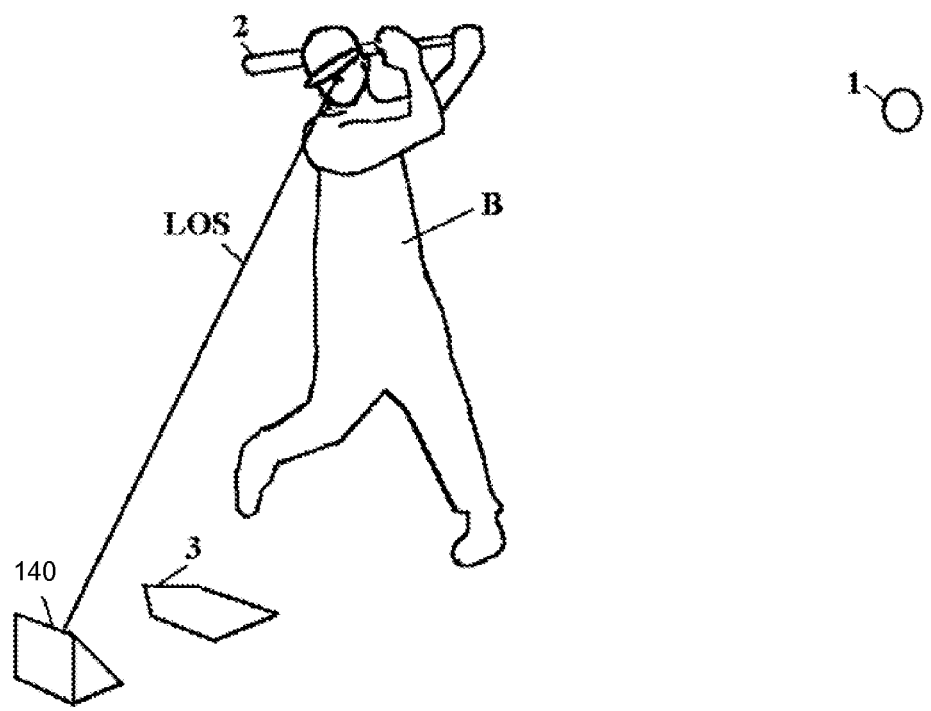

FIGS. 2A-2C illustrate an example of the training device in use during a swing motion. FIG. 2A illustrates a baseball batter B prior to the swing motion. The batter B is looking at a ball 1 along a line of sight (LOS) as the ball approaches and is preparing to hit the ball 1 with a bat 2. The batter B is wearing a batting glove 4. Assume that the ball 1 travels approximately over a home plate 3. The base unit 140 would be placed along a path from the batter B's eyes and the approximate trajectory of the ball 1 over home plate 3, i.e., along the correct LOS. At this time, the batter's eyes are to be focused on the ball 1 as it travels along the path. In this example, the remote unit 130 is mounted on the batter B's glove 4, as illustrated in the close-up view 200, but may be located on the batter's wrist or arm. The remote unit 130 is waiting to detect a swing motion.

FIG. 2B illustrates the baseball batter B batting the ball 1 with a bat 2 during the swing motion. The batter B's eyes follows the ball 1 as it travels from the position shown in FIG. 2A to the position in FIG. 2B. If the batter B is visually tracking the ball 1 correctly, then the batter B's eyes would be focused on ball 1 along the LOS. Batter B's correct LOS would put the base unit 6 directly in the batter B's field of vision at the time of impact between the bat 2 and the ball 1. If batter B is looking elsewhere at the time of impact, then the base unit 140 would not be in the batter B's LOS. As the batter B swings the bat 2, the remote unit 130 detects the swing motion and sends a signal or message to the base unit 140. The base unit 140 responds by displaying the visual symbol to be visible to the batter B immediately following the bat and ball collision.

FIG. 2C illustrates the baseball batter B immediately after batting the ball 1, after the swing motion. Assuming the batter B's bat makes contact with the ball 1, the ball 1 is now in flight away from batter B. During this time, the base unit 140 continues to display the visual symbol for the predetermined period of time. When the batter B's eyes are in the correct LOS during the swing motion, then the batter B would see the visual symbol displayed by the base unit 140 correctly. Otherwise, the batter B may not see the visual symbol correctly. After the swing motion is completed, the batter B inputs the visual symbol that he or she saw into the remote unit 130.

Figure 3:
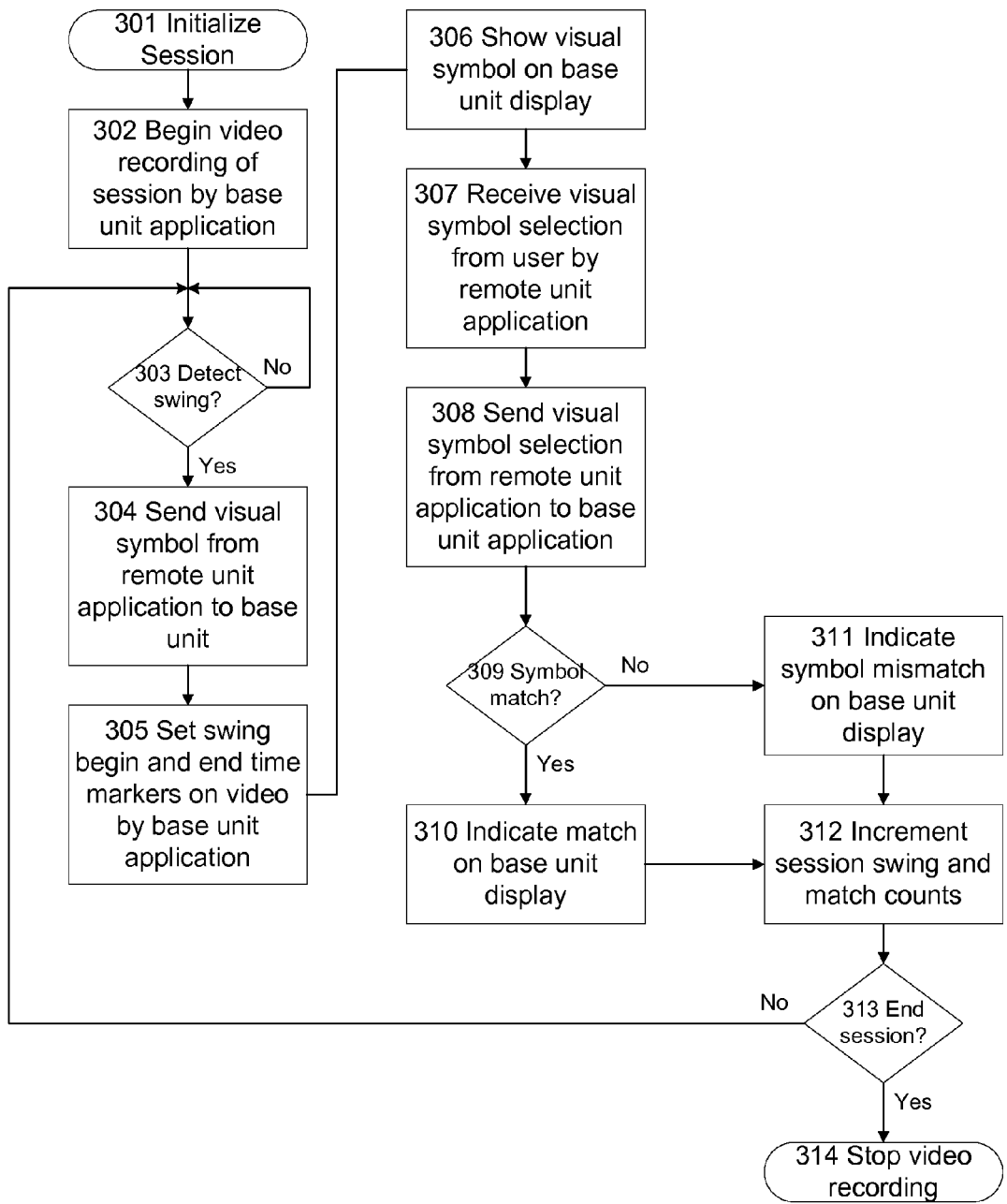
FIG. 3 is a flowchart illustrating a method for swing detection and training according to the first embodiment of the present invention.

FIG. 3 is a flowchart illustrating a method for swing detection and training according to the first embodiment of the present invention. First, a training session is initialized (301). For example, the training session may be initialized when the remote unit application 120 is activated or when manually initialized by a user. In this embodiment, the initialization of the training session includes the remote unit application 120 establishing a connection with the base unit application 170. Once the training session is initialized, the base unit application 170 begins to record a video of the training session using the camera 161. The remote unit 130 then waits for a swing to be detected using the accelerometer 5 (303). Once a swing is detected, the remote unit application 120 sends a visual symbol to the base unit application 170 (304). Alternatively, the remote unit application 120 sends a message to the base unit application 170 that a swing has been detected, in response to which the base unit application 170 selects the visual symbol to display. The base unit application 170 then sets a begin time marker and an end time marker on the video (305). In this embodiment, upon the detection of the swing, a current timestamp is determined by the base unit application 170. The begin time marker is than set at a predetermined time prior to the current timestamp, and the end time marker is set at another predetermined time after the current timestamp. For example, the begin time marker may be set at 1 second before the current timestamp, and the end time marker may be set at 1 second after the current timestamp. In this manner, the full swing motion may be captured between the begin and end time markers. The times prior and after the current timestamp may be a tunable parameter.

The base unit application 170 then shows the visual symbol on the base unit display 160 for a predetermined period of time (e.g. between 0.5 and 1.0 seconds) (306). The base unit 140 would be placed by a user at a location such that the visual symbol would be visible to the player immediately following contact with the ball, if the player's head and eyes are in the proper position during the swing motion. Referring back to FIGS. 2A-2C, when the batter B's eyes are in the correct LOS during the swing motion, then the batter B would see the visual symbol displayed on the base unit display 160 correctly. After the swing motion is completed, the batter B inputs the visual symbol that she or he saw into the remote unit 130. For example, the batter B may select the observed symbol from a series of symbols shown on the remote unit display 110. For another example, the batter B may use gestures to indicate the symbol observed, such as making an X shape with his arm to indicate observation of an X symbol. Upon receiving the visual symbol selection from the user/batter by the remote unit application 120 (307), the remote unit application 120 sends the visual symbol selection to the base unit application 170 (308). The base unit application 170 then compares the visual symbol selection with the displayed visual symbol (309). If there is a match, then the base unit application 170 indicates the match on its display 160 (310). Otherwise, the base unit application 170 indicates a mismatch on its display 160 (311). Alternatively, the remote unit application 120 does not send the visual symbol selection to the base unit application 170 but instead performs the comparison of the visual symbol selection with the displayed visual symbol at the remote unit 130. In this case, the remote unit application 120 may inform the base unit application 170 whether there is a match or mismatch. The match or mismatch may be indicated on the base unit display 160 or indicated on the remote unit display 110 instead or as well. In this manner, the user/batter is immediately informed whether his or her eyes were in the correct LOS during the swing motion. Optionally, a session swing count and a match count may be maintained. The session swing count is the number of swings detected during the training session, and the match count is the number of correct visual symbol selections. When one or both of these counts are used, they are incremented according to the results of the match (312). Both counts may be initialized during the initialization of the training session. If the training session is to continue (313), then the remote unit application 120 waits for a detection of the next swing motion (303), upon which steps 304-312 are repeated. If the training session is to end, then the base unit application 170 stops its video recording (314). The training session may be manually ended by the user. Alternatively, the training session may be automatically ended without user intervention when another application on the remote unit 130 or base unit 140 is activated or after no swing motions have been detected for some predetermined period of time. Other manners of ending the training session manually or automatically are possible. Optionally, upon the end of the training session, the base unit application 170 may prompt the user for instructions related to the video recording. For example, the user may be asked whether to save all recorded swing motions or only those with incorrectly selected visual symbols, etc.

The user may then view the video recording to review their swing mechanics. However, reviewing the entire session, including pauses, adjustments, symbol selection, etc. may be inefficient or undesirable. To improve the user experience, the video may be trimmed by the base unit application 170 to remove unwanted segments. For example, the base unit application 170 may trim the full video to only include the clips between the begin and end time markers for each swing motion. Other examples include trimming the full video to only include the clips for the swing motions associated with incorrect symbol selections or to only include the best swing motions. The base unit application 170 may combine the clips into a single video ordered according to the current timestamps or place all clips into a single session folder. The video trim durations may further be a user settable parameter. Such settings may be saved for repeated use, for example, one set of settings for baseball, another for tennis, etc. Alternatively or in addition, the base unit application 170 may provide instant replays of the most recent swing motion or swing motions. Video recordings of ideal swing motions may also be provided, which a user may use to compare with the player's swing motion(s).

Once the training session ends, the session swing count and the match count may be displayed and/or used for analysis, such as determining a percentage of correct or incorrect selections. Other data may also be captured, displayed, and/or analyzed, such as the G-force for the swing(s). The data captured during the training session may further be shared with others, via a cloud computing application or platform, such as with coaches, teammates, friends, etc. Social gaming features may also be implemented to encourage use. For example, when a user reaches a certain performance level, an achievement is earned. Leaderboards may be used among teammates or across teams. Sample achievements that can be earned include: number of total swings; number of swings in one minute; number of swings on consecutive days; "under-the-lights" for a session between 10 pm and 2 am; "doubleheader" for 2 sessions on the same day; number of correct selections in a row; percentage of correct selections within a session; etc.

Optionally, the training device 1000 may include a "warm-up" mode, during which swings are detected and video recorded as set forth above except the visual symbols are not displayed. The video recordings and other results from the "warm-up" may then be compared with the video recordings and results from the "regular mode", where the symbols are displayed as described above.

Figure 4:
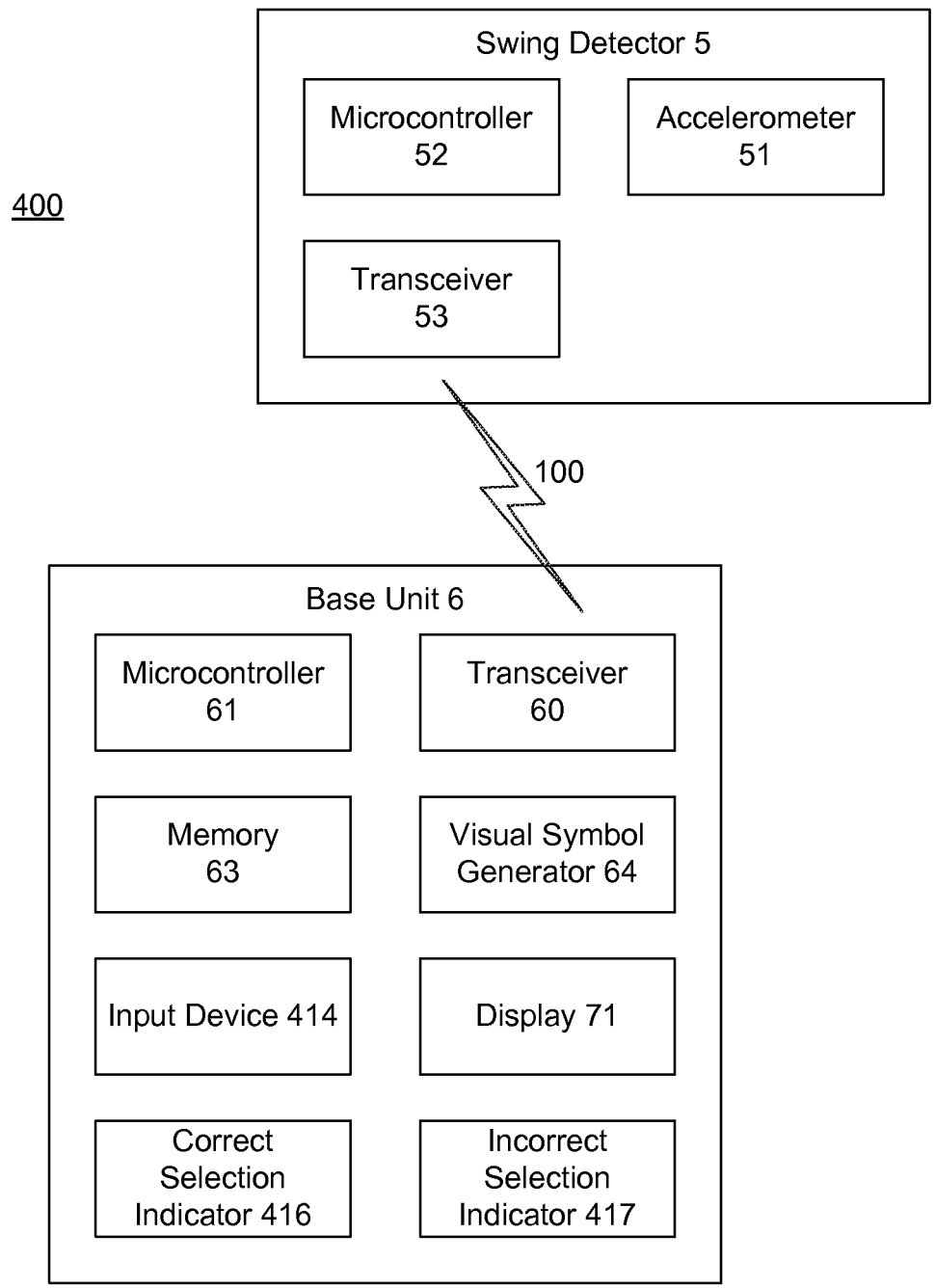
FIG. 4 illustrates a sports swing mechanics training device according to a second embodiment of the present invention.

FIG. 4 illustrates a sports swing mechanics training device according to a second embodiment of the present invention. The training device 400 comprises hardware components, including a swing detector 5 for detecting a swing motion and a base unit 6 for responding to the detection of the swing motion. The swing detector 5 comprises a microcontroller 52, an accelerometer 51, and a transceiver 53. The swing detector 51 may detect a swing motion by G-force. Other manners of detecting a swing motion include but are not limited to radar, optical detection, image analysis, and ultrasonic detection. Upon detecting a swing motion, the microcontroller 52 provides a signal via the transceiver 53 to the base unit 6 to indicate the occurrence of a swing motion. The signal may be transmitted over a wireless connection, such as WiFi, Bluetooth, RF, cellular, etc. Alternatively, the signal may be transmitted over a wired-based connection, such as USB, Ethernet, coaxial, fiber optic, wire line, etc. The swing detector 5 may be located on a player's bat, glove, club, or racket. The swing detector 5 may alternatively be located on a wrist of the player's arm that's swinging the bat, glove, club, or racket.

The base unit 6 comprises a microcontroller 61, a transceiver 60, a memory 63, a visual symbol generator 64, an input device 414, a display 71, and indicators 416-417. The display 71 may be of any type, for example, LED lights, an LCD screen, or a touchscreen. The input device 414 may be of any type, for example, switches, touches or gestures on a touchscreen, buttons, and a keyboard. The indicators may be of any type, for example, LED lights, icons/text on a screen, and audio sounds. The transceiver 60 of the base unit 6 receives the signal from the swing detector 5 indicating the detection of the swing motion. Immediately in response, the microcontroller 61 causes the visual symbol generator 64 to send one or more visual symbols to the display 71 to be visible for a predetermined period of time (e.g. between 0.5 to 1.0 seconds). The base unit 6 would be placed by a user at a location, such that the visual symbols would be visible to the player immediately following contact with the ball, if the player's head and eyes are in the proper position during the swing motion. The microcontroller 61 records the visual symbol in the memory 63. The player then inputs the visual symbol seen on the display 71 via the input device 414. The microcontroller 61 compares the inputted visual symbol and the visual symbol in memory 63. If the two matches, then the microcontroller 61 activates the correct selection indicator 416. Otherwise, the microcontroller 61 activates the incorrect selection indicator 417. In this manner, the player would be informed whether his or her head and eyes were in the proper position during the swing motion.

Although the swing detector 5 and the base unit 6 are illustrated in FIG. 4 as separate units, the functions of the swing detector 5 and the base unit 6 may be integrated into the same unit, in different variations, without departing from the spirit and scope of the present invention.

Figure 5:
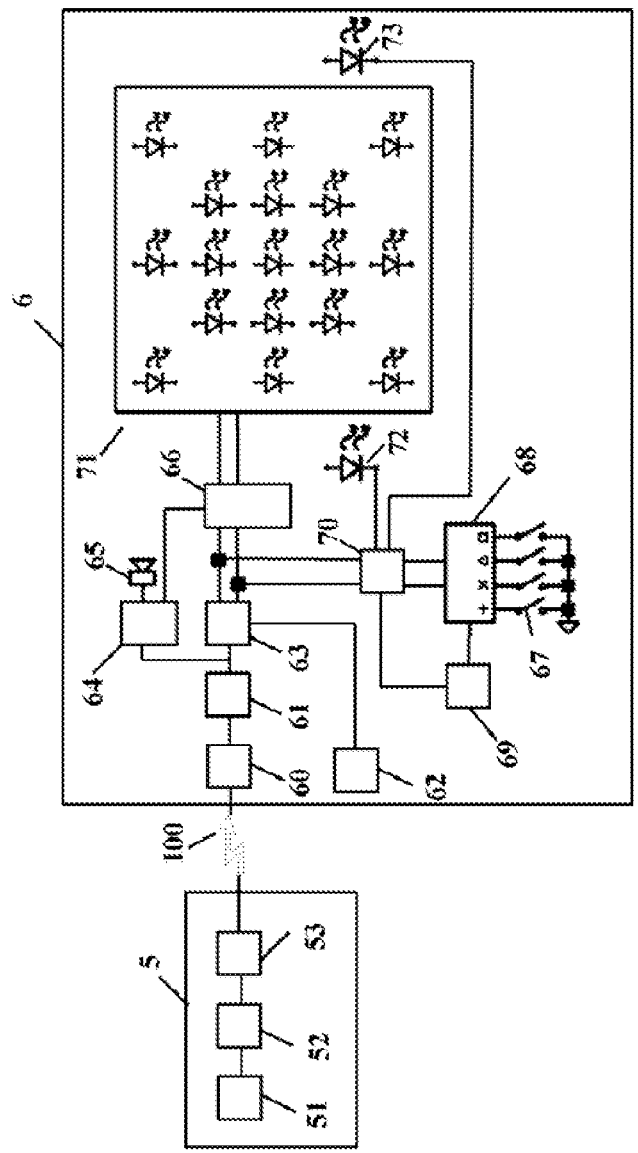
FIG. 5 illustrates in more detail the sports swing mechanics training device according to the second embodiment of the present invention.

FIG. 5 illustrates in more detail the sports swing mechanics training device according to the second embodiment of the present invention. The swing detector 5 comprises the accelerometer 51, the microcontroller 52, and the transceiver 53 (see also FIG. 4). The accelerometer 51 is a three-axis accelerometer with a range of up to 8G of force. As the player swings the bat/club/racket, the accelerometer 51 generates signals responsive to the player's swing motion. In this embodiment, the accelerometer 51 provides serial data with three data values, one for an X-axis, one for a Y-axis, and one for a Z-axis. Microcontroller 25 contains threshold levels in non-volatile memory (not shown) that provides trip level signals for each accelerometer axis. Microcontroller 52 compares each axis data value with its corresponding axis trip level value from a reference source. When an axis force exceeds its trip level, the microcontroller 52 sends a signal to the transceiver 53. Responsive to the message from the microcontroller 52, the transceiver 53 transmits a swing-detect signal 100.

Signal 100 is received by a transceiver 60 in base unit 6. Responsive to signal 100, the transceiver 60 passes the signal to the microcontroller 61. The microcontroller 61 issues a swing-detect pulse signal, which is fed to the pulse generator 64. In this embodiment, a random signal generator 62 is constantly generating four binary numbers. The swing-detect signal of receiver 61 latches one of the four random numbers into memory 63. The binary code representing the latched number is fed to a display decoder-driver 66. At the same time, responsive to the swing-detect signal from receiver 61, pulse generator 64 issues a flash pulse lasting between one-half and one second. In response to and during the flash pulse, decoder-driver 66 selectively illuminates LED's of a shape display 71. The LED's of display 71 can be bright enough to be easily visible in sunlight. Responsive to decoder-driver 66, display 71 flashes a shape corresponding to the binary number latched in memory 63. In an embodiment of the present invention, the shapes square, triangle, X, and cross are flashed. Other shapes or colors may be used. Optionally, after the end of the flash of display 71, pulse generator 64 energizes the beeper 65 to give an audible indication of the swing detection. The binary number latched in memory 63 is also fed to a comparator 70. Also feeding comparator 70 is an input device 414 in the form of an array of switches 67, each switch input corresponding to a binary number representing one of the shapes of display 71. In an embodiment of the present invention, the switches of array 67 are designed to be activated by the player. Each switch is labeled with the shape corresponding to the binary number it invokes. Activating a switch of array 67 also causes a pulse generator 69 to issue a pulse lasting several seconds. If the switch of array 67 corresponding to the shape having been flashed by display 71 is activated, the correct selection indicator 416, in the form of a "correct" green light 73, is illuminated for several seconds. Conversely, a non-match illuminates the incorrect selection indicator 417, in the form of a red "incorrect" light 72. Thus, if the eyes of the player have been correctly directed along the LOS, the player can select the correct switch, causing the green light 73 to be illuminated. Otherwise, the red light 72 would be illuminated.

Figure 6:
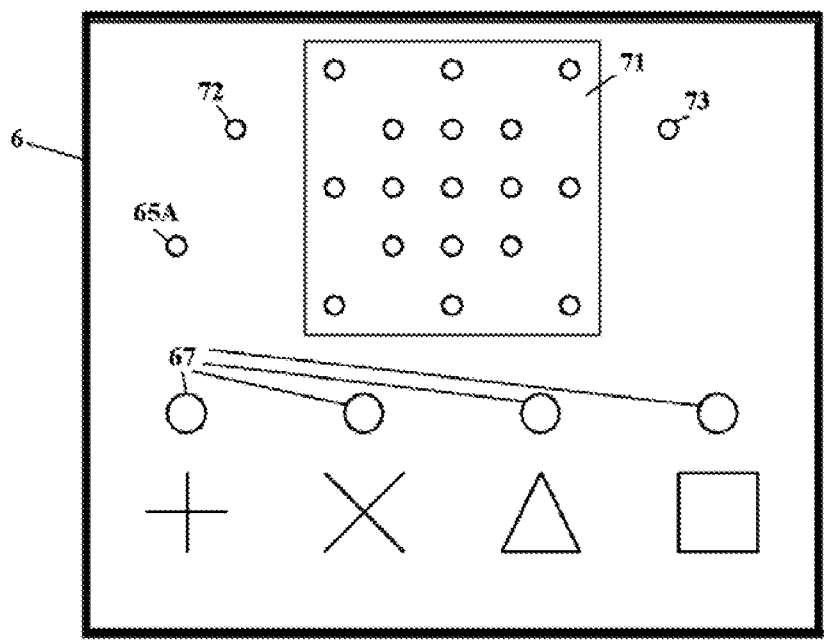
FIG. 6 illustrates an example view of the player interface on the base unit.

FIG. 6 illustrates an example view of the player interface on the base unit 6. The interface includes the LED's of display 71, the red light 72 as the incorrect selection indicator 417, the green light 73 as the correct selection indicator 416, an orifice 65a to permit the sound from the beeper 65 to be emitted from the base unit 6, and the array 67 of switches each labeled with the shape to which it corresponds.

Optionally, the base unit 6 may also comprise circuitry and displays to track the number of swings and the number of correct or incorrect visual selections made by the player. The base unit 6 may further display a maximum G-force occurring during the swing. The training device may further allow a user to adjust various parameters, including the detection of the swing motion, the delay between swing detection and the visual symbol display, and the duration of the visual symbol delay. For example, sometimes a tee or holder is used to hold the ball to be hit. In this case, by adjusting the parameters, the player can receive the appropriate feedback on the correct eye position in order to improve performance.

Figure 7:
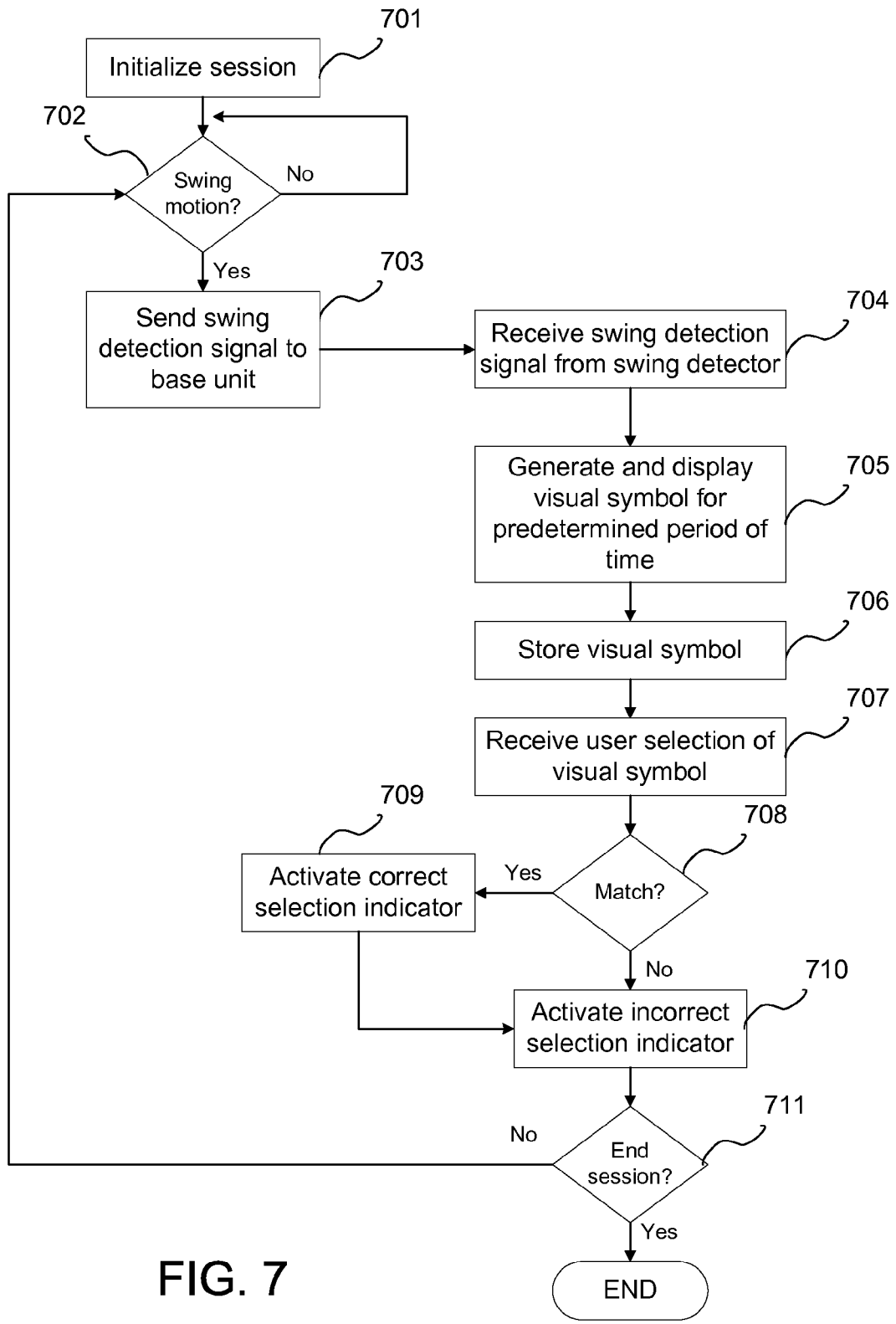
FIG. 7 is a flowchart illustrating a method for swing detection and training according to the second embodiment of the present invention.

FIG. 7 is a flowchart illustrating a method for swing detection and training according to the second embodiment of the present invention, executed by the hardware components illustrated in FIG. 4. First, a training session is initialized on the swing detector 5 and the base unit 6 (701). If swings are to be counted, then the counters stored at the base unit 6 are initialized as well. The swing detector 5 then waits to detect a swing motion (702). When a swing motion is detected, a swing detection signal 100 is sent from the swing detector 5 to the base unit 6 (703). The swing detector 5 then waits for the next swing motion. The base unit 6 receives the swing detection signal 100 from the swing detector 5 (704), and in response, generates and displays a visual symbol on the display 71 for a predetermined period of time (705). The base unit 6 further stores the displayed visual symbol in memory 63 (706). When a user selection of the visual symbol (707) is received via the input device 414, the base unit 6 compares the user selection with the stored visual symbol. If they match (708), the base unit 6 activates the correct selection indicator 416 (709). If they do not match, then the incorrect selection indicator is activated (710). Steps 702-710 are repeated until the training session ends (711). If the swings are being counted, then the counter(s) are adjusted accordingly. For example, if the number of correct visual symbols selected is being counted, then when the symbols match, a "correct" counter is incremented. If the number of incorrect visual symbols selected is being counted, then when the symbols do not match, an "incorrect" counter is incremented. If a total number of swings is being counted, then for each swing detection message received, a "total swings" counter is incremented. The counters may then be displayed and/or used for analysis, such as determining a percentage of correct or incorrect selections. Other data may also be captured, displayed, and/or analyzed, such as the G-force for the swing(s).

The training device according to the present invention may also comprise multiple base units 140 or 6 placed in different locations and each reacting to activation by a single remote unit 130 or swing detector 5, respectively. This may be desirable, for example, during baseball batting practice during which the ball may be thrown inside (closer to the batter), middle (directly over home plate), or away (farther from the batter) to simulate in-game action and creating different lines of site. In one embodiment, a user selects a particular base unit 140 (or base unit 6) to which the remote unit 130 (or swing detector 5) is to be connected, based on the location to which the ball is to be thrown. The location the ball is thrown to effects the point of collision and determines the proper line of site, and the base unit 140 (or base unit 6) in this line of site would be selected to connect to the remote unit 130 (or swing detector 5). The visual symbol would then be displayed on the selected base unit 140 (or base unit 6) in the manner described above.

A sports swing mechanics training device has been disclosed. The trainer assists in training players to keep their heads and eyes correctly directed at the point of collision between a bat/club/racket and the ball. The assistance is provided in a manner which directly correlates to eye position during and immediately following the swing motion. The training device allows for the objective determination of correct or incorrect swing mechanics that may be self-administered and without replacing standard practice equipment.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing sports swing mechanics training, comprising:
   (a) receiving, by a base unit of a training device, a swing detection message, wherein the swing detection message indicates a detection of a swing motion by a player;
   (b) in response to receiving the swing detection message, displaying, by the base unit of by-the training device, a visual symbol for a predetermined period of time during the swing motion, wherein the base unit is placed at a location wherein the displayed visual symbol would be visible to the player immediately following contact with a ball when the player's eyes are in a desired position during the swing motion;
   (c) receiving a user selection of a visual symbol from the player by the training device;
   (d) comparing the user selection with the displayed visual symbol by the training device;
   (e) in response to determining that the user selection matches the displayed visual symbol, indicating a symbol match by the training device; and
   (f) in response to determining that the user selection does not match the displayed visual symbol, indicating a symbol mismatch by the training device.

2. The method of claim 1, wherein the receiving (c), the comparing (d), and indicating (e), and the indicating (f) are performed by the base unit.

3. The method of claim 1, wherein the indicating (e) and the indicating (f) comprises:
   (e1) in response to determining that the user selection matches the displayed visual symbol, activating a correct selection indicator by the base unit; and
   (f1) in response to determining that the user selection does not match the displayed visual symbol, activating an incorrect selection indicator by the base unit.

4. The method of claim 3, wherein the base unit of the training device comprises one of the following: a smartphone; a personal computer; a laptop computer; a tablet; and a smart watch.

5. The method of claim 1, wherein the receiving (a) comprises:
   (a1) initializing a training session by the training device;
   (a2) beginning a video recording of the training session by the base unit of the training device; and
   (a3) in response to receiving the swing detection message, setting a begin time marker and an end time marker in the video recording,
   wherein the method further comprises:
   (g) determining an end to the training session by the training device; and
   (h) creating a plurality of video clips by the base unit, wherein each video clip comprises a video from the begin time marker to the end time marker associated with the swing motion.

6. The method of claim 5, wherein the method further comprises:
   (i) combining, by the base unit, the plurality of video clips into a single video.

7. The method of claim 1, further comprising:
   (g) incrementing a session swing count, wherein the session swing count is a number of swing motions detected during the training session; and
   (h) in response to determining that the user selection matches the displayed visual symbol, incrementing a match count, wherein the match count is a number of correct user selections.

8. A system, comprising:
   a swing detector comprising:
     an accelerometer for detecting a swing motion by a player; and
     a microcontroller for sending to a base unit a signal indicating the detection of the swing motion; and
   the base unit comprising:
     a display;
     a visual symbol generator for, in response to receiving the signal from the swing detector, generating a visual symbol and displaying the visual symbol on the display for a predetermined period of time during the swing motion, wherein the base unit is placed at a location wherein the displayed visual symbol would be visible to the player immediately following contact with a ball when the player's eyes are in a desired position during the swing motion;
     a memory for storing the displayed visual symbol;

an input device for receiving a user selection of a visual symbol from the player;

a comparator for comparing the user selection with the stored visual symbol;

a correct selection indicator, wherein in response to determining that the user selection matches the stored visual symbol, the correct selection indicator is activated; and an incorrect selection indicator, wherein in response to determining that the user selection does not match the stored visual symbol, the incorrect selection indicator is activated.

9. The system of claim 8, further comprising a plurality of base units coupled to the swing detector, wherein the plurality of base units is placed at a plurality of locations corresponding to a plurality of desired positions for the player's eyes.

10. A computer readable medium comprising computer readable program code embodied therein, wherein when executed by a processor causes the processor to:

receive a swing detection message by a base unit of a training device, wherein the swing detection message indicates a detection of a swing motion by a player;

in response to receiving the swing detection message, display, by the base unit, a visual symbol for a predetermined period of time during the swing motion, wherein the base unit is placed at a location wherein the displayed visual symbol would be visible to the player immediately following contact with a ball when the player's eyes are in a desired position during the swing motion;

receive a user selection of a visual symbol from the player;

compare the user selection with the displayed visual symbol;

in response to determining that the user selection matches the displayed visual symbol, indicate a symbol match; and in response to determining that the user selection does not match the displayed visual symbol, indicate a symbol mismatch.

11. The medium of claim 10, wherein computer readable program code, when executed by the processor, further causes the processor to:

initialize a training session;

begin a video recording of the training session;

in response to receiving the swing detection message, set a begin time marker and an end time marker in the video recording;

determine an end to the training session;

create a plurality of video clips, wherein each video clip comprises a video from the begin time marker to the end time marker associated with the swing motion.

12. The medium of claim 11, wherein computer readable program code, when executed by the processor, further causes the processor to:

combine the plurality of video clips into a single video.

13. The medium of claim 10, wherein computer readable program code, when executed by the processor, further causes the processor to:

increment a session swing count, wherein the session swing count is a number of swing motions detected during the training session; and in response to determining that the user selection matches the displayed visual symbol, increment a match count, wherein the match count is a number of correct user selections.

* * * * *

UNITED STATES PATENT AND TRADEMARK OFFICE
CERTIFICATE OF CORRECTION

PATENT NO. : 9,442,633 B2
APPLICATION NO. : 14/473408
DATED : September 13, 2016
INVENTOR(S) : Dyer et al.

It is certified that error appears in the above-identified patent and that said Letters Patent is hereby corrected as shown below:

In the Claims

Column 11, Line 57, delete "by-".

Signed and Sealed this
Tenth Day of January, 2017

Michelle K. Lee
*Director of the United States Patent and Trademark Office*